A. N. EATON.
STOCK WATERING TANK.
APPLICATION FILED APR. 10, 1920.
1,346,307.  Patented July 13, 1920.
2 SHEETS—SHEET 1.
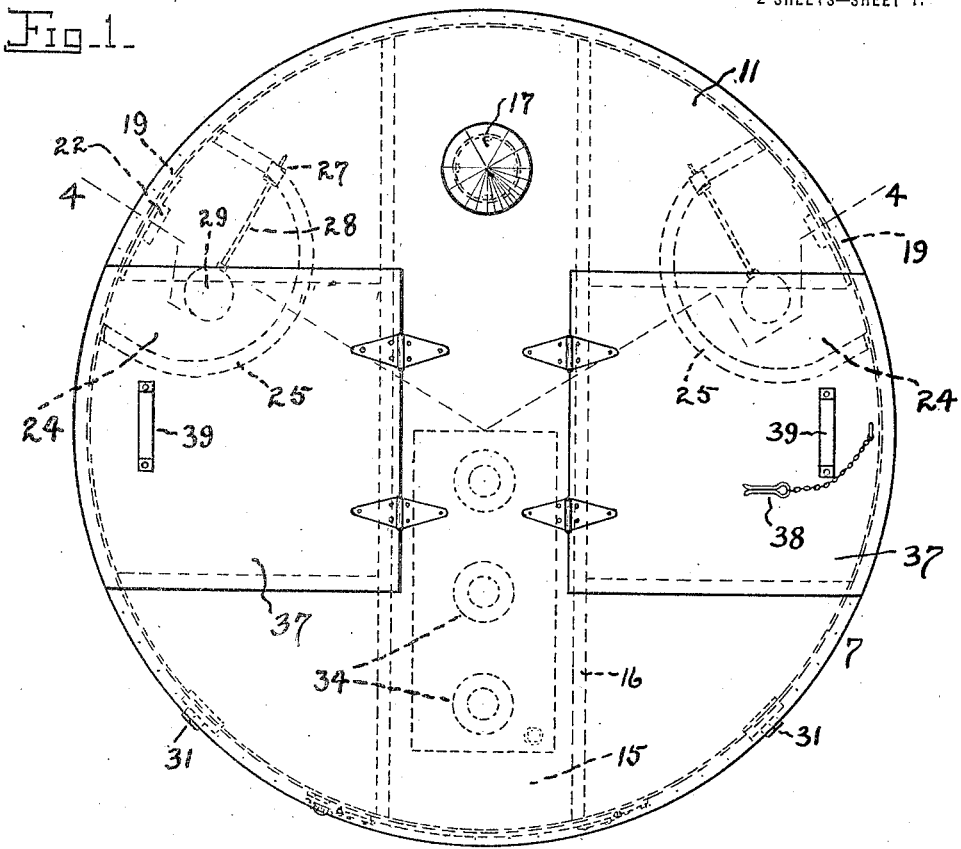
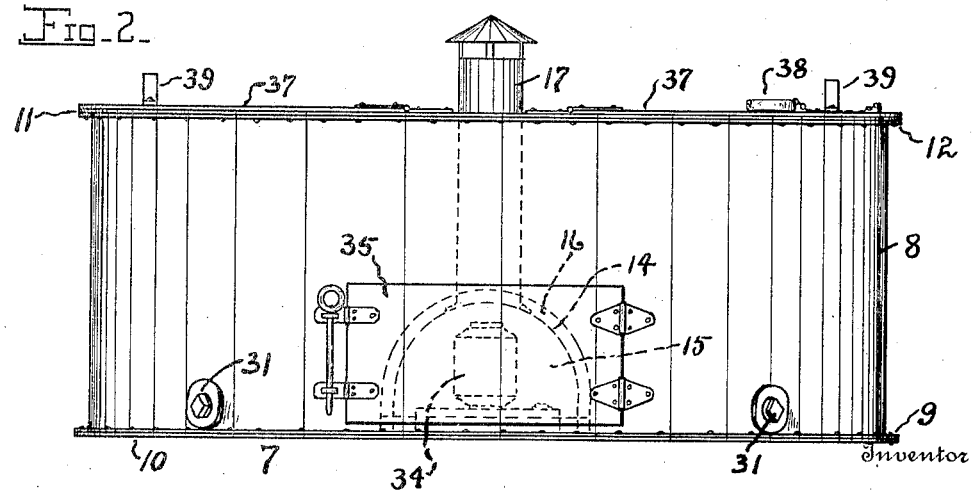
Inventor
Albert N. Eaton,
By
Hiram A. Sturges
Attorney A. N. EATON.
STOCK WATERING TANK.
APPLICATION FILED APR. 10, 1920.
1,346,307.
Patented July 13, 1920.
2 SHEETS—SHEET 2.
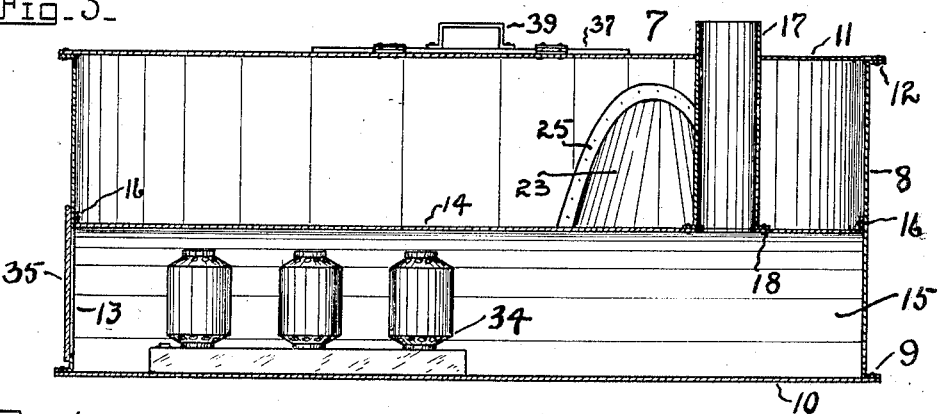
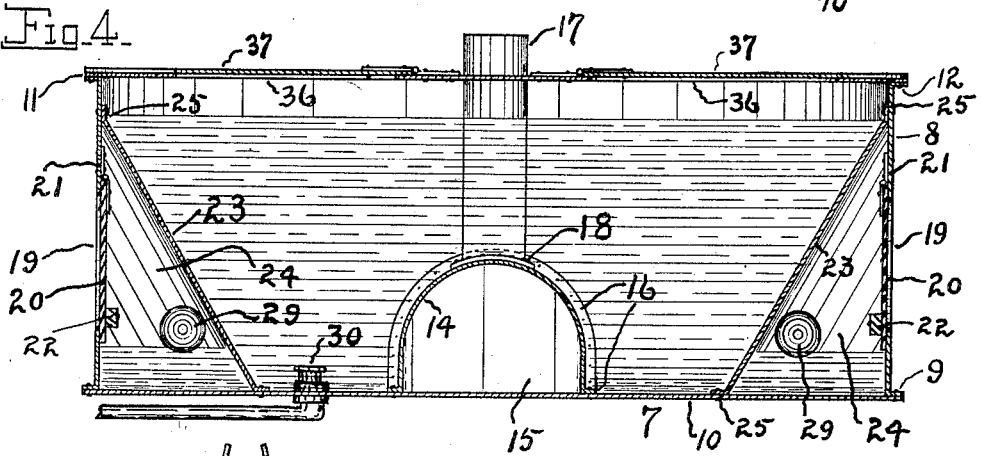
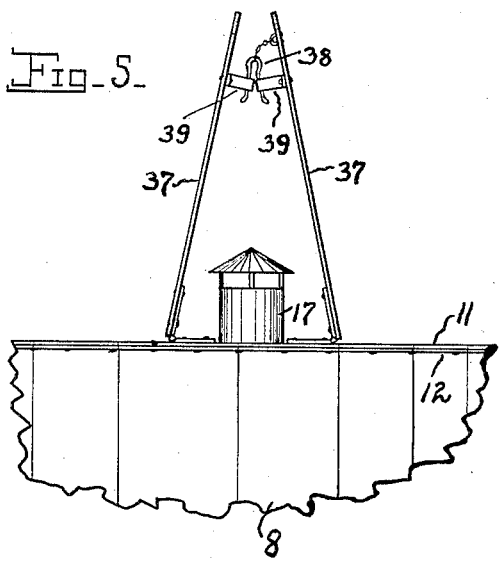
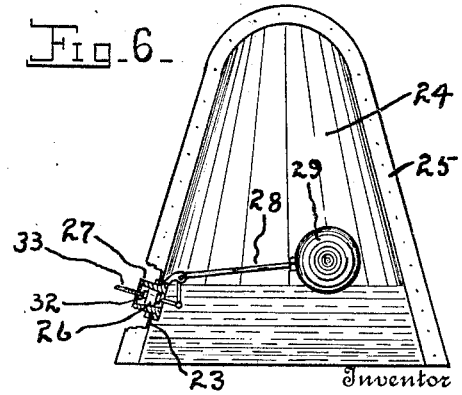
Albert N. Eaton,
Inventor
By Hiram A. Sturgel,
Attorney

UNITED STATES PATENT OFFICE.

ALBERT N. EATON, OF OMAHA, NEBRASKA.

STOCK-WATERING TANK.

1,346,307.  Specification of Letters Patent.  Patented July 13, 1920.

Application filed April 10, 1920. Serial No. 372,736.

*To all whom it may concern:*

Be it known that I, ALBERT N. EATON, a citizen of the United States, residing at Omaha, in the county of Douglas and State of Nebraska, have invented certain new and useful Improvements in Stock - Watering Tanks, of which the following is a specification.

This invention has for its object to provide a watering tank for both swine and cattle, and to be of such construction that its contents may be maintained in a cleanly condition and at a temperature above freezing, will operate automatically in supplying water to certain of its drink-compartments and may be manufactured economically.

The invention consists of the novel construction, combination and arrangement of parts as described herein and claimed, and as illustrated in the accompanying drawing, wherein—

Figure 1 is a plan view of the tank. Fig. 2 is a front view of the same. Fig. 3 is a sectional view taken longitudinally of the heating compartment. Fig. 4 is a sectional view on line 4—4 of Fig. 1. Fig. 5 is a broken away detail showing the top doors in an elevated position. Fig. 6 is a broken away detail showing the mounting of a float valve.

Referring now to the drawing, I provide a stock watering tank 7 preferably of circular form in plan, its side wall 8 being provided with a flange 9 for a water tight connection with its imperforate bottom 10, the top 11 of the tank being disposed approximately parallel with the bottom and being connected with the flange 12 of the side wall.

Numeral 13 (Fig. 3.) indicates an aperture formed in the side wall 8 at the front of the tank, and at 14 is indicated a semi-circular wall for a horizontal oven or heating compartment 15 which extends to the rear of the tank, said wall 14 being provided with flanges 16 for water-tight connections with the side wall 8 and bottom of the tank, a draft pipe 17 of suitable length being provided which communicates with the heating compartment 15 and projects through the top of the tank, said pipe being provided with a flange 18 for a water-tight connection with the wall 14 of the compartment 15, between the ends thereof.

Numerals 19 indicate drink - apertures formed in the side wall, doors 20 being provided and hingedly connected at their upper ends, as indicated at 21, with the inner side of the side wall, for making closures of the apertures, said doors being provided with weights 22. Numerals 23 indicate partition walls of concavo-convex form which are provided for the tank, providing compartments 24 communicating with the apertures 19, said walls 23 being provided with flanges 25 for water-tight connections with the side and bottom of the tank; valves 26 (Fig. 6.) being provided, each having a valve-housing 27 mounted upon a wall 23, and having an arm 28 provided with a float 29.

Numeral 30 indicates the intake for a water supply pipe for the tank, and the tank is provided with clean-out plugs 31. By adjusting the nuts 32 on the threaded valve-stems 33, the arc of movement of the L-shaped arms 28, which have pivotal connections with the valves, may be greater or less to permit a greater or lesser supply of water to enter the compartments 24, and on account of the construction, a fresh supply of water will automatically enter said compartments during removal of their contents.

While I have shown two drinking compartments in the side wall, the number may be greater or less. It will be noted that the doors may swing inwardly and hang dependingly, and normally will remain closed to prevent cold air from entering, the weights 22 tending to maintain them in closed relation with the apertures 19. In operation, the swine push the doors inwardly to gain access to the water, the latter being maintained at a temperature above freezing by means of suitable lamps 34 placed in the compartment 15, a door 35 being adapted to make a closure of the aperture 13.

Numerals 36 indicate drink-apertures for use of live stock, these being formed in the top, near opposite sides of the tank, and disposed in planes adjacent to the apertures 19 so that cattle and hogs may be watered at the same time without interference, one with the other, each aperture 36 being provided with a door 37 which is hinged to the top of the tank near the middle thereof, and since the tank is of limited height, nearly all kinds of live stock may be watered from the apertures 36, the doors being held in an elevated position for this purpose by any suitable means, as by use of the clamping-member 38 (Fig. 5.) adapted to engage the handles 39 of the doors.

The novel features of the invention as described, will be appreciated by those engaged in stock-raising in cold latitudes. Since the draft-pipe is disposed inwardly from the side of the tank, it will probably not become injured by stock when running at large. Since the heating compartment has a length approximately equal to the diameter of the tank, water will be heated to advantage; and the fact that the apertures 36 for use of cattle and apertures 19 for use of swine, for drinking purposes, are disposed in planes somewhat remote, is an obvious advantage.

I claim:

A watering tank, comprising, in combination with a receptacle having a drink-aperture in its side wall and a pair of drink-apertures in its top, and having a drinking-compartment opening on the drink-aperture of its side wall, a valve for controlling a communication of the receptacle with said drinking-compartment, a hingeably mounted door in said drinking-compartment, doors provided with fastening-devices and having their inner ends hingeably mounted adjacent to each other upon the top near the medial line of the receptacle and adapted to swing upwardly to permit engagement of their fastening devices, and adapted to be swung downwardly to make closures of the drink-apertures of said top, and a wall of inverted U-shape in cross-section mounted upon the bottom to provide a heating-compartment extending from the front to the rear side of the receptacle, said drink-aperture in the side being disposed in a plane adjacent to a drink-aperture of the top of said receptacle.

In testimony whereof, I have affixed my signature in presence of two witnesses.

ALBERT N. EATON.

Witnesses:
 HIRAM A. STURGES,
 ARTHUR H. STURGES.